(12) United States Patent
Glazman et al.

(10) Patent No.: US 6,264,555 B1
(45) Date of Patent: Jul. 24, 2001

(54) AMUSEMENT GAME INCLUDING VIDEO DISPLAYS NOT RELATED TO THE GAME

(75) Inventors: Martin A. Glazman, Deerfield; Edward J. Suchocki, Buffalo Grove, both of IL (US)

(73) Assignee: Midway Games, Inc., Chicago, IL (US)

( * ) Notice: Subject to any disclaimer, the term of this patent is extended or adjusted under 35 U.S.C. 154(b) by 0 days.

(21) Appl. No.: 09/245,537

(22) Filed: Feb. 5, 1999

(51) Int. Cl.$^7$ ........................................... A63F 13/00
(52) U.S. Cl. ................... 463/1; 463/30; 345/211; 273/138
(58) Field of Search ............... 463/1–20; 345/200–212; D21/370; 296/21

(56) References Cited

U.S. PATENT DOCUMENTS

| | | | |
|---|---|---|---|
| 4,542,897 | * 9/1985 | Melton et al. | 272/73 |
| 5,326,104 | * 7/1994 | Pease et al. | 273/138 |
| 5,382,026 | * 1/1995 | Harvard et al. | 273/310 |
| 5,412,404 | * 5/1995 | Candy | 345/211 |
| 5,695,107 | * 12/1997 | Shoemaker, Jr. | 226/39 |
| 5,746,656 | * 5/1998 | Bezick et al. | 463/42 |
| 5,816,918 | 10/1998 | Kelly et al. | 436/16 |
| 5,917,725 | * 6/1999 | Thatcher et al. | 364/410.1 |

FOREIGN PATENT DOCUMENTS

| | | | |
|---|---|---|---|
| 30 48393 A1 | * 12/1980 | (DE) | . |
| 2 141 907 | * 6/1983 | (GB) | . |
| 2 253 325 | * 2/1991 | (GB) | . |
| 92/14526 | * 2/1991 | (WO) | . |

OTHER PUBLICATIONS

NFL Blitz, Midway Games Inc., sold approximately Oct. 1997.

Open Ice, Midway Games Inc., sold approximately Oct. 1995.

* cited by examiner

Primary Examiner—Joe H. Cheng
Assistant Examiner—Kathleen M. Christman
(74) Attorney, Agent, or Firm—Ronald B Cooley; Jenkens & Gilchrist

(57) ABSTRACT

A video display system for an amusement game includes a controller, a first source of information coupled to the controller, the first source of information containing video information related to the game. A second, alterable source of information is coupled to the controller, the second source of information containing video information not related to the game. A video display is coupled to the game controller, and is responsive to the controller for selectively displaying video information related to the game and video information not related to the game.

20 Claims, 6 Drawing Sheets

AMUSEMENT GAME INCLUDING VIDEO DISPLAYS NOT RELATED TO THE GAME

FIELD OF THE INVENTION

The present invention relates generally to amusement games, and more particularly, to amusement games which have a capability of displaying video information which is not related to the game.

BACKGROUND OF THE INVENTION

There are a variety of amusement games are played on game units or machines of the type which include a CRT or similar video displays which display video information associated with the play of the game while the game is being played. The term "amusement game" as used herein may refer either to the game unit or machine, or to a game which may be played on the game unit. Often, when the game is not being played, a so-called attract mode is displayed on the video display, usually consisting of video information which is in some way related to the game or the play of the game. Generally speaking, all of the displays usually associated with amusement games are in some manner related to the game or the play of the game itself.

In addition to the display of the information associated with active play of the game, related information may also be displayed corresponding to such things as high scores achieved by previous players of the game, and the like. Similarly, the information displayed in connection with play of the game may be actual images generated in response to player input, or informational images associated with game set up, play options, scoring, number or identity of players, rules, or the like. In the attract mode, similar images of game play may be generated by the video game itself without player input. Likewise, information as to available modes of game play, scoring and set up information and other information related to the game may also be displayed in the attract mode.

However, the inventors are not aware that heretofore video displays of either moving video images or other information not related to the game or to the play of the game have been provided in amusement games. Such displays may include various types of advertisements such as advertisements for unrelated products or services, advertisements for other games which are provided by the manufacturer of the game, some of which may be present in the same location, such as an arcade or the like. Other such information may be in the form of so-called infomercials or other unrelated materials. Such other unrelated material may be video tape or other storage medium-based containing entertainment, news, weather, sports or the like, or images imported from internet or other on-line sources or from satellite TV or broadcast TV. The foregoing are all by way of example and are not intended to limit the invention in any way.

Accordingly, it is a general object of this invention to provide for the display of video information in an amusement game, which video information is not related to the game.

A related object is to provide for the display of advertising information in an amusement game.

A further related object is to provide for the display of such advertising or other information not related to the game during an attract mode of the game.

Yet a further object is to provide for the display of advertising or other information not related to the game in response to predetermined events occurring during play of the game.

SUMMARY OF THE INVENTION

In accordance with one aspect of the present invention, there is provided a video display system for an amusement game. The display system comprises a controller, a first source of information coupled to the controller and containing video information related to the game, a second, alterable source of information coupled to the controller, and containing video information not related to the game, and a video display coupled to the controller, the display being responsive to the controller for selectively displaying video information related to play of the game and video information not related to the game.

In accordance with another aspect of the invention there is provided a video display system for an amusement game. The display system comprises a controller, an alterable source of information coupled to the controller, the source of information containing video information related to the game and video advertising information, and a display coupled to the controller, the display being responsive to the controller for displaying the information related to the game and for displaying the video advertising information.

In accordance with another aspect of the invention there is provided an amusement game comprising a controller, a first source of information coupled to the controller and containing video information related to the game, a second, alterable source of information coupled to the controller and containing video information not related to the game, and a video display coupled to the controller, the display being responsive to the controller for selectively displaying video information related to the game and video information not related to the game.

In accordance with another aspect of the invention there is provided an amusement game comprising a controller, an alterable source of information coupled to the controller, the source of information containing video information related to the game and video advertising information, and a display coupled to the controller, the display being responsive to the controller for displaying the information related to the game and for displaying the video advertising information.

In accordance with another aspect of the invention there is provided a method of operating a video display system for an amusement game, the method comprising the steps of providing an alterable source of information containing video information related to the game and video information not related to the game, selecting information from said source for display, and displaying the selected information.

In accordance with another aspect of the invention there is provided a method of operating a video display for an amusement game, said method comprising the steps of providing an alterable source of information containing video information related to the game and video advertising information, selecting information from said source, and displaying the selected information.

DETAILED DESCRIPTION

Figure 1:
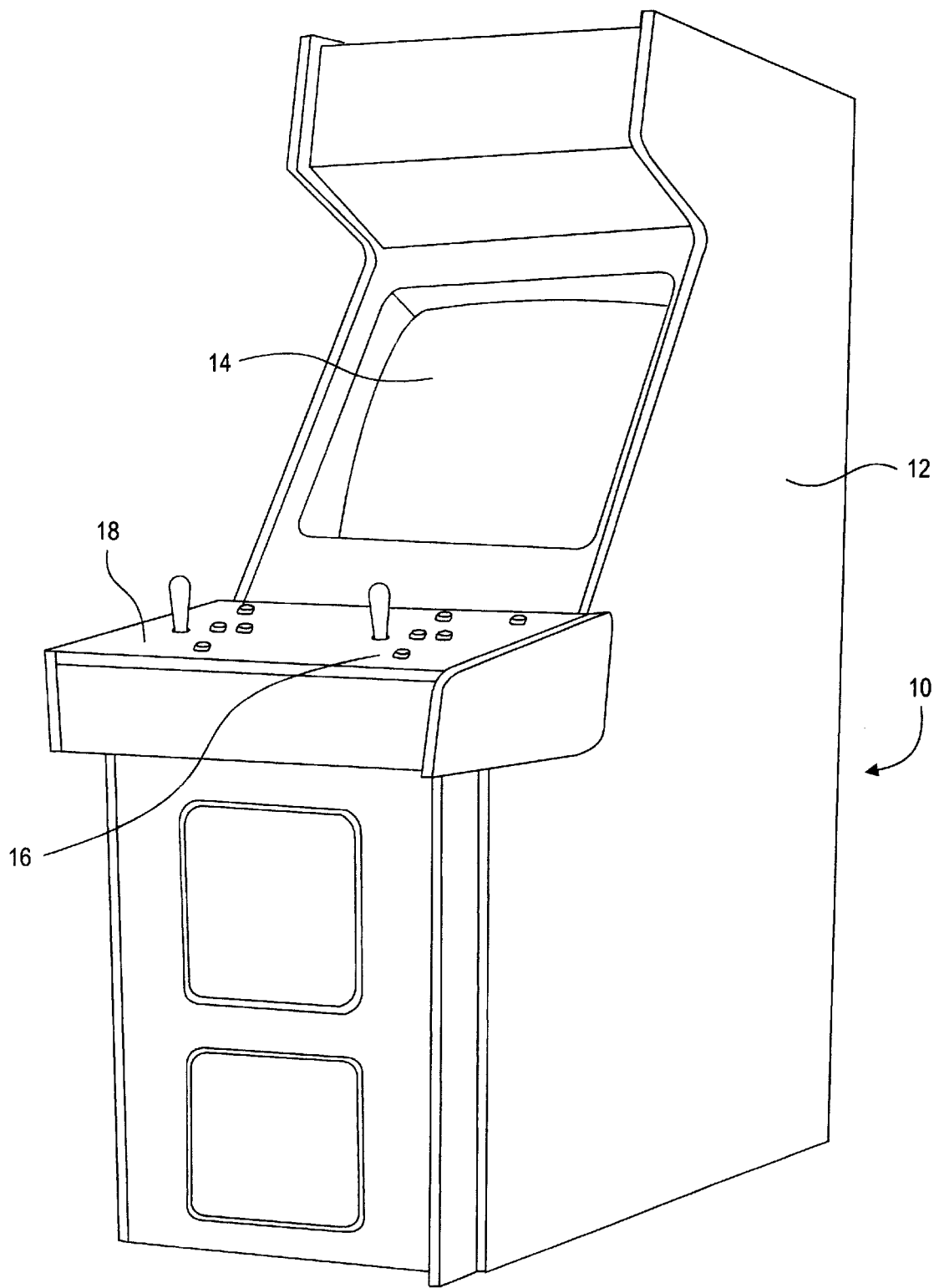
FIG. 1 is a perspective view of one type of amusement game in accordance with the invention.

While the invention is susceptible to various modifications and alternative forms, specific embodiments have been shown by way of example in the drawings and will be described in detail herein. However, it should be understood that the invention is not intended to be limited to the particular details disclosed. Rather, the invention is to cover all modifications, equivalents, and alternatives falling within the spirit and scope of the invention as defined by the appended claims.

Figure 2:
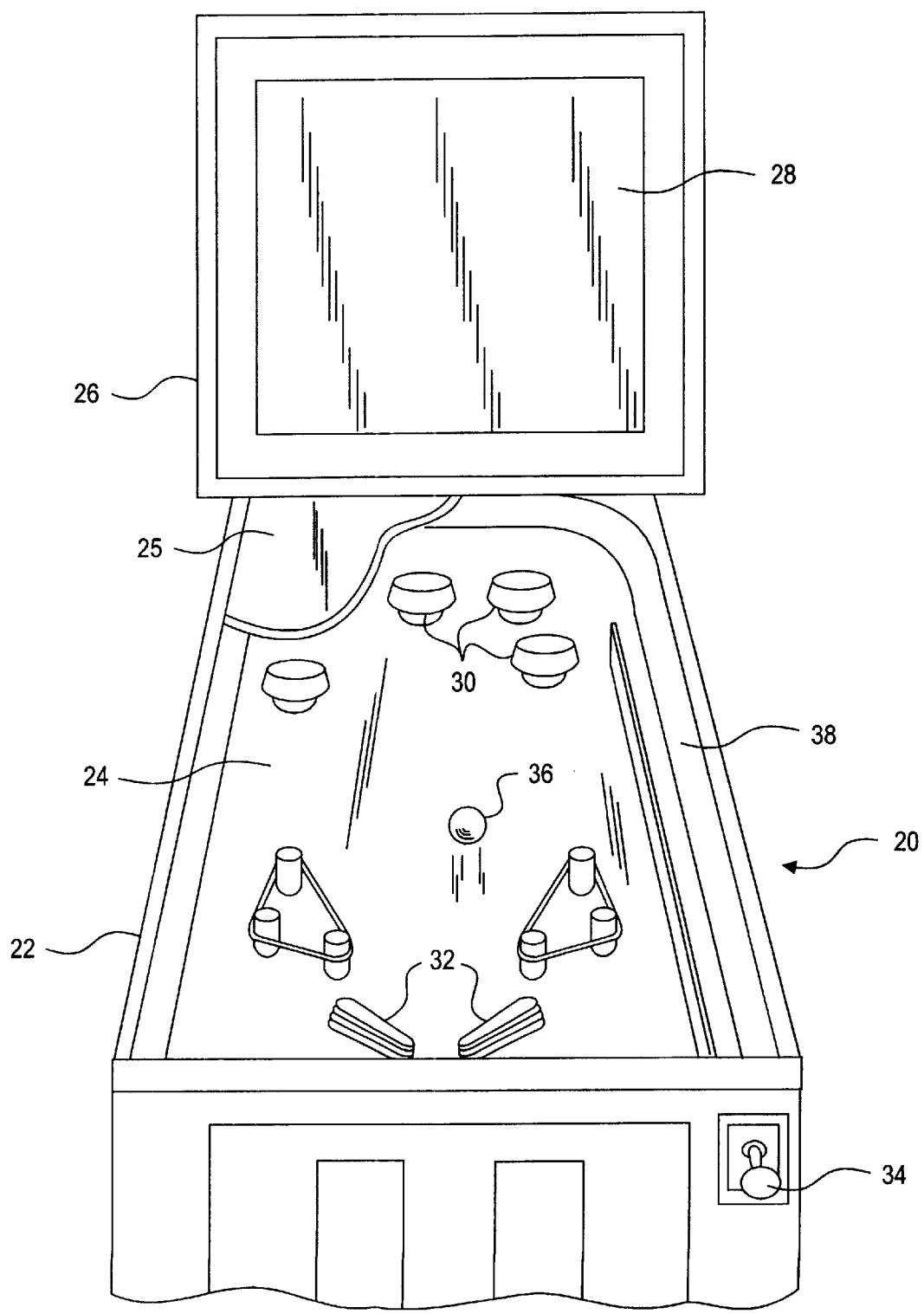
FIG. 2 is a perspective view of another type of amusement game in accordance with the invention.

Turning now to the drawings, FIGS. 1 and 2 show two different types of amusement games, in connection with which the present invention may be embodied. However, the invention may be embodied in other types of games without departing from the invention as defined in the claims which follow.

FIG. 1 illustrates a video game unit 10 including a housing or cabinet 12 and a video display 14. The video game 10 includes player accessible controls 16 which may be located on a control panel 18. A controller (shown in FIGS. 6 and 7) is responsive to player manipulation of the control 16 for controlling play of the game and the display of associated video displays on the display 14. In the illustrated embodiment, the display 14 is a CRT, however, any functionally equivalent type of display might be used, such as LED or LCD matrices which are capable of displaying video information having essentially the same appearance as when the same information is displayed on a CRT.

FIG. 2 illustrates a second type of amusement game unit, generally called a pinball machine, and designated generally by reference numeral 20. The pinball machine 20 includes a game cabinet 22, which holds a playfield 24, and a backbox 26 which holds a display panel 28. In the illustrated embodiment, the display panel 28 comprises a CRT, however, any functionally equivalent type of display might be used, such as LED or LCD matrices which are capable of displaying video information having essentially the same appearance as when the same information is displayed on a CRT. The playfield 24 may include a number of playfield accessories such as bumper or target elements 30 and flippers 32. Game play is usually initiated by activating a plunger element 34 to propel a ball 36 onto the playfield 24. Preferably, the playfield 24 is inclined somewhat from the horizontal such that the ball 36 tends to roll back towards the flippers 32. The plunger element 34 shoots the game ball 36 up an alley 38 onto the playfield 24. The playfield 24 may be recessed some distance from the top surface of the cabinet 22, which is covered with a transparent or glass sheet 25 to permit viewing of the playfield 24. The pinball machine 20 may include other orientations of the playfield 24, and/or additional or different features in the playfield 24 without departing from the invention, the foregoing being by way of example only.

In conventional amusement games, the display unit of the game unit usually displays information associated with or related to the game itself or the play of the game. The information may include a display of current game activity, a display of scoring information or other information related to the game itself and to the play of the game. However, in accordance with the present invention, the video display, such as CRT video displays 14 and 28 in FIGS. 1 and 2, may also be utilized to additionally display other information which is not related to the game itself or to the play of the game.

Figure 3:
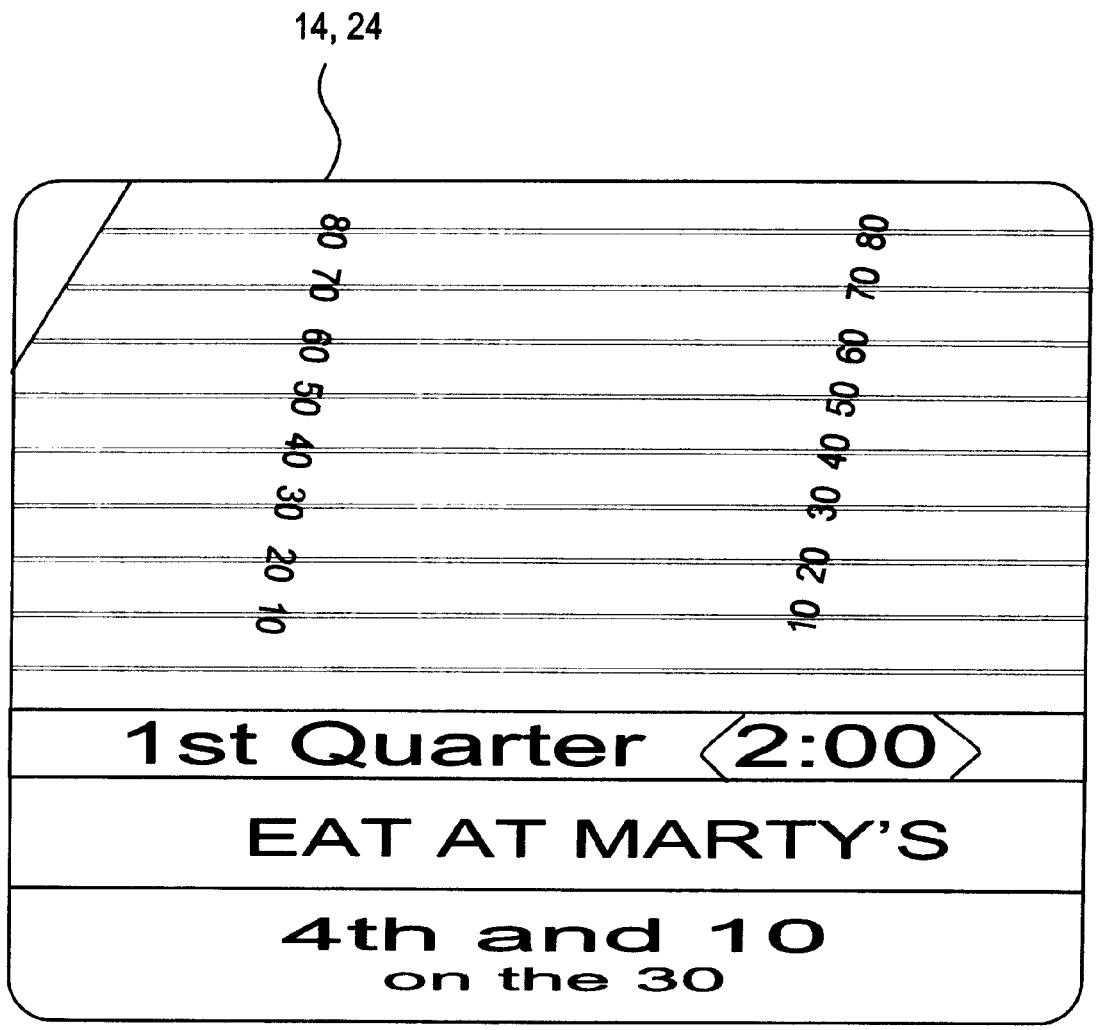
FIG. 3 is a further illustration of video display similar to those shown in FIGS. 1 and 2, showing a display of information not related to the game at a random time.
Figure 4:
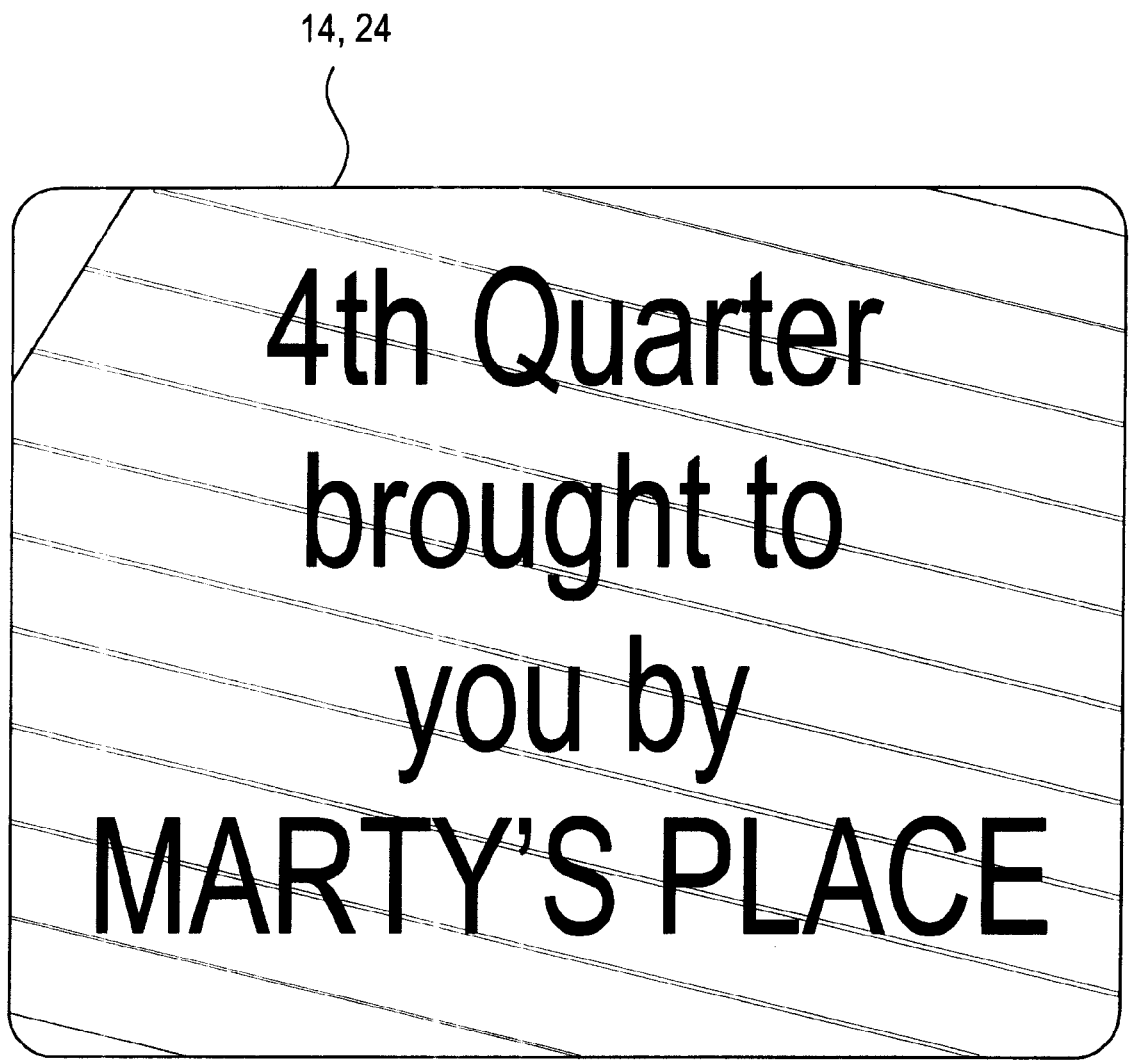
FIG. 4 is an illustration of the video display screen similar to FIG. 1 showing the display of information not related to the game in response to the occurrence of a given event in the game.

Referring now to FIG. 3, this other or additional information may include advertising which is displayed together with the display of game-related information. This advertising information may also be displayed separately from the game-related information, such as during an attract mode as indicated for example in FIG. 5. Alternatively, the advertising or other video information not related to the game may be displayed in response to predetermined events occurring during the game as indicated in FIG. 4. In FIG. 3, the advertising or other information not related to the game is shown being displayed randomly at some time during the play of the game.

The video information not related to or associated with the game may take many forms. For example, the information may comprise primarily textual information or messages as illustrated in FIGS. 3 and 4 or may comprise any one, or any combination of, text, video displays, graphics, animations, live action video or any other material capable of display on a video display such as a CRT, without departing from the invention.

In the example shown in FIGS. 3 and 4, the advertising information, as mentioned above, is textual information which is displayed over the display of the play of the game and associated information. For example, in FIG. 3, a football type of video game is illustrated wherein, in addition to a background display of a football field, information relating to the game is displayed, for example, first quarter, two minutes remaining, fourth and ten, ball on the thirty.

In the example shown in FIG. 4, the beginning of the fourth quarter of the football game is an example of a predetermined event occurring during play of the game which triggers an advertising message. In FIG. 4, a similar football game is illustrated, such that the game related display includes an image of a football field.

Figure 5:
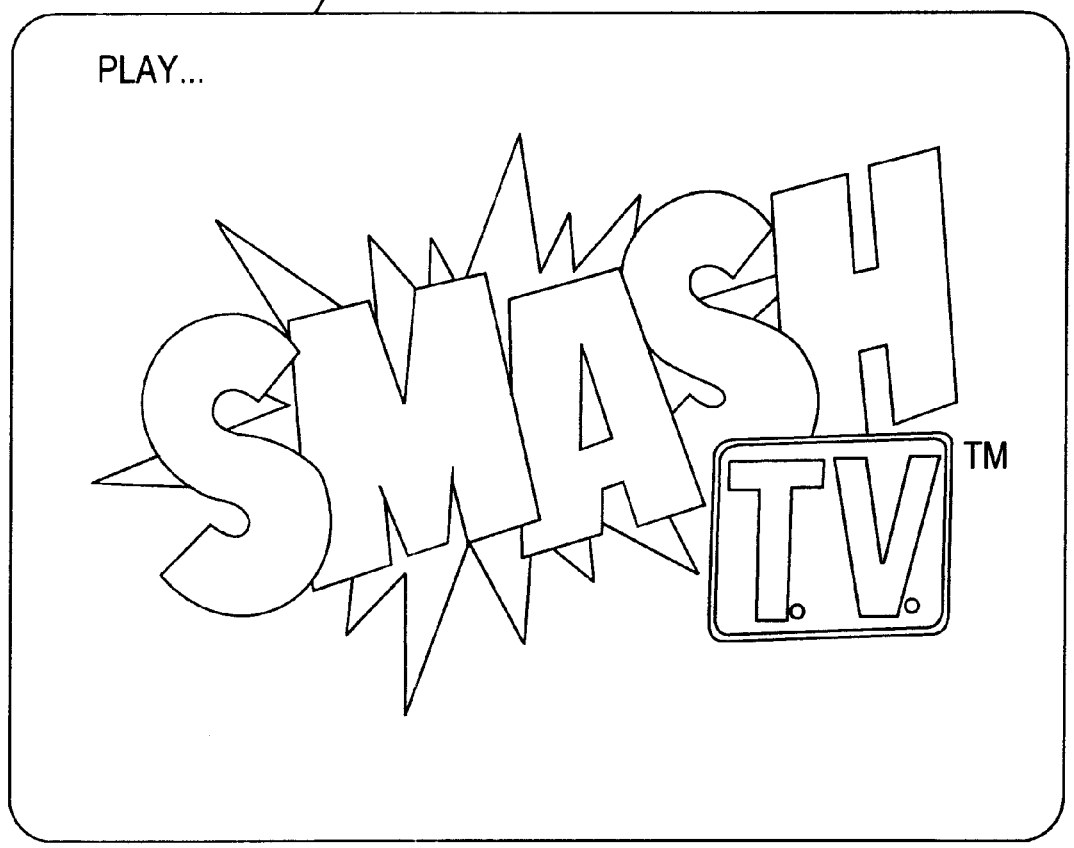
FIG. 5 is an illustration of a video display screen similar to FIGS. 3 and 4 illustrating the display of information such as advertising not related to the game, during an attract mode of the game.

In FIG. 5, a video display not related to the game or to the game itself is illustrated. While this display may occur briefly during the play of the game, it may also occur during a so-called attract mode, in which various video images are displayed while the game is not actively being played. The advertising display of FIG. 5 may also be displayed intermediate predetermined or preselected game portions, such as where pauses in the game action occur, for example, between the quarters or periods of the football game, or during a "time-out," or following a scoring play, or the like. In the example shown in FIG. 5, an advertisement for another amusement game, SMASH TV™ is shown. It is further noted that the advertising messages shown in FIGS. 3 through 5 are for purposes of example only. While these drawings show fixed images, due to the limitations of illustration herein, the images displayed may include moving images such as animation or "live action" within the scope of the invention, or any combination of moving images ("full motion video") and fixed images such as background images or text or other alphanumeric information.

Moreover, while advertising images have been illustrated and described with reference to FIGS. 3 through 5, the video displays or images not related to or associated with the game itself or with the play of the game may include other video information. Such information may include, but is not limited to entertainment, news, weather, sports, images stored on videotape or disc or other storage media, or images imported from on-line sources or internet, satellite TV, broadcast TV or the like.

Figure 6:
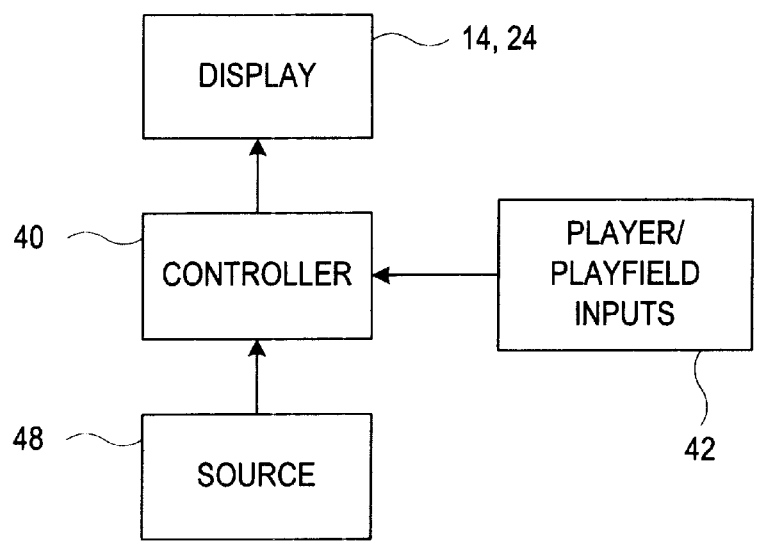
FIG. 6 is a block diagram showing apparatus in accordance with one embodiment of the invention.
Figure 7:
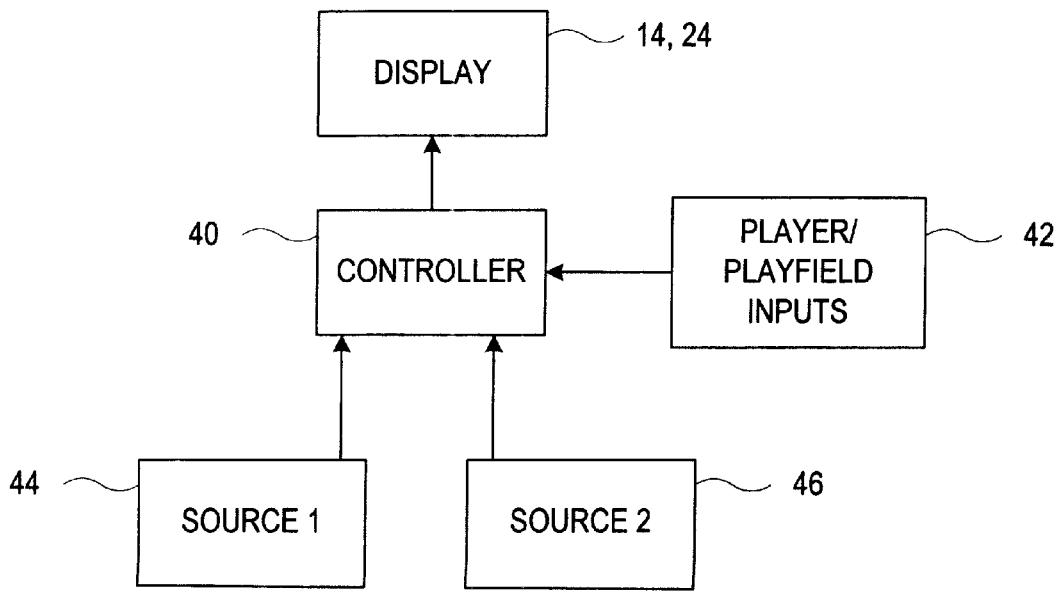
FIG. 7 is a block diagram showing apparatus in accordance with another embodiment of the invention.

Referring now to FIGS. 6 and 7, two forms of amusement game control and display systems are illustrated in functional block form. In both FIGS. 6 and 7, the display 14 (or 24) is operatively coupled with a controller 40. The controller 40 sends video information to the display 14 (or 24) responsive to inputs from one or more sources. These sources may include player inputs such as the controls 18 of FIG. 1, and/or playfield inputs, such as the various elements in the playfield of the pinball game as shown in FIG. 2. The player/playfield inputs are designated generally by reference numeral 42. In FIG. 7, a first source of information 44 supplies video information related to the game, while a second source 46 supplies video information to the controller which is not related to the game. In FIG. 6, a single source 48 provides all of the video information to the controller, both information related to the the game and information, as discussed above, which is not related to the game. The controller 40 determines when to display the video information not related to the game, for example, at a random time, during an attract mode, or in response to some predetermined event occurring during the play of the game, as described above.

In accordance with the invention, at least the source 46 or 48 of video information not related to the game is an alterable source, which may take many forms. That is, the video information not related to the game may be readily altered or changed as desired. The source 44 may also be alterable if desired. The source 46 or 48 may be in the form of an alterable memory device which is part of the game unit and housed within the same cabinet as the game and/or display. The source 46 or 48 may incorporate sources of video information such as a video tape player, video disk player or other storage and/or playback device for playing back prerecorded video information, such that the information may be altered by supplying a different disc, tape or other recorded medium. The source may also include a modem, antenna or other connection to a network or broadcast source for downloading or otherwise receiving video information from a source external to the game itself and thereby altering or changing the video information as desired. In this regard, the source 46 or 48 may include such antennas, receivers, decoders, modems, or other wired or wireless connections to various networks, and any necessary hardware for downloading or otherwise receiving information from such networks or other outside sources, and for converting such information to a form suitable for processing by the controller 40.

The apparatus shown in FIGS. 6 and 7 carry out a method of operating an amusement game video display in accordance with the invention. This method includes providing one or more sources of information containing video information related to the game and video information not related to the game, such as advertising information, selecting information from said one or more sources and displaying the selected information.

What has been illustrated and described herein above is a novel and improved amusement game display system and method for displaying both information related to an amusement game and information not related to the game.

What is claimed is:

1. A video display system for an amusement game, said video display system comprising:
 a controller;
 a first source of information coupled to the controller, the first source of information containing video information related to the game;
 a second source of information coupled to the controller, the second source of information containing video information not related to the game;
 a video display coupled to the game controller, the display being responsive to the controller for selectively displaying video information related to the game and video information not related to the game; and
 at least said second source of information comprising an alterable source of information; wherein the video information not related to the game is displayed in response to predetermined events occurring during play of the game.

2. The display system of claim 1 wherein the video information not related to the game comprises advertising.

3. The display system of claim 1 wherein the video information not related to the game is displayed during an attract mode.

4. The display system of claim 1 wherein the first and second sources of information comprises a single source.

5. The system of claim 1 wherein said video display comprises a CRT.

6. A video display system for an amusement game, said video display system comprising:
 a controller;
 an alterable source of information coupled to the controller, the source of information containing video information related to the game and video advertising information, so at least said video advertising information being alterable; and
 a display coupled to the controller, the display being responsive to the controller for displaying the information related to the video game and for displaying the video advertising information; wherein the video advertising information is displayed in response to predetermined events occurring during play of the game.

7. The display system of claim 6 wherein the video advertising information is displayed during an attract mode.

8. The system of claim 6 wherein said display comprises a CRT.

9. An amusement game comprising:
 a controller,
 a first source of information coupled to the controller, the first source of information containing video information related to the game;
 a second source of information coupled to the controller, the second source of information containing video information not related to the game;
 a video display coupled to the game controller, the display being responsive to the controller for selectively displaying video information related to the game and video information not related to the game; and
 at least said second source of information being alterable; wherein the video information not related to the game is displayed in response to predetermined events occurring during play of the game.

10. The amusement game of claim 9 wherein the video information not related to the game comprises advertising.

11. The amusement game of claim 9 wherein the video information not related to the game is displayed during an attract mode.

12. The amusement game of claim 9 wherein said video display comprises a CRT.

13. The amusement game of claim 9 wherein the first and second sources of information comprise a single source.

14. An amusement game comprising:

a controller;

an alterable source of information coupled to the controller, the source of information containing video information related to the game and video advertising information at least said video advertising information being alterable; and a video display coupled to the game controller, the display being responsive to the controller for displaying the video information related to the game and for displaying the video advertising information; wherein the video advertising information is displayed in response to predetermined events occurring during play of the game.

15. The video game of claim 14 wherein the video advertising information is displayed during an attract mode.

16. The amusement game of claim 14 wherein said video display comprises a CRT.

17. A method of operating an amusement game video display system said method comprising the steps of:

providing an alterable source of information containing video information related to the game and video information not related to the game;

selecting information from said source for display; and displaying the selected information; wherein the step of selecting includes selecting video information not related to the game for display in response to predetermined events occurring during play of the game.

18. The method of claim 17 wherein the step of selecting comprises selecting the video information not related to the game for display during an attract mode.

19. A method of operating a video display for an amusement game, the method comprising the steps of:

providing an alterable source of information containing video information related to the game and video advertising information;

selecting information from said source; and displaying the selected information; wherein the step of selecting includes selecting the video advertising information for display in response to predetermined events occurring during play of the game.

20. The method of claim 19 wherein the step of selecting includes selecting the video advertising information for display during an attract mode of the game.

* * * * *